April 14, 1936.      F. W. VON WERTHER      2,037,552
CABLE SYSTEM
Filed Jan. 21, 1933
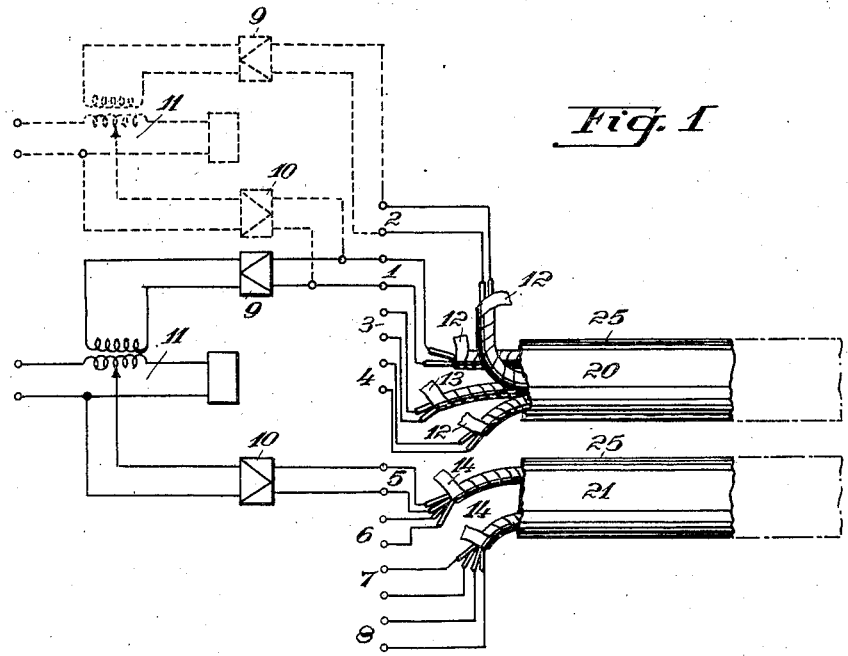
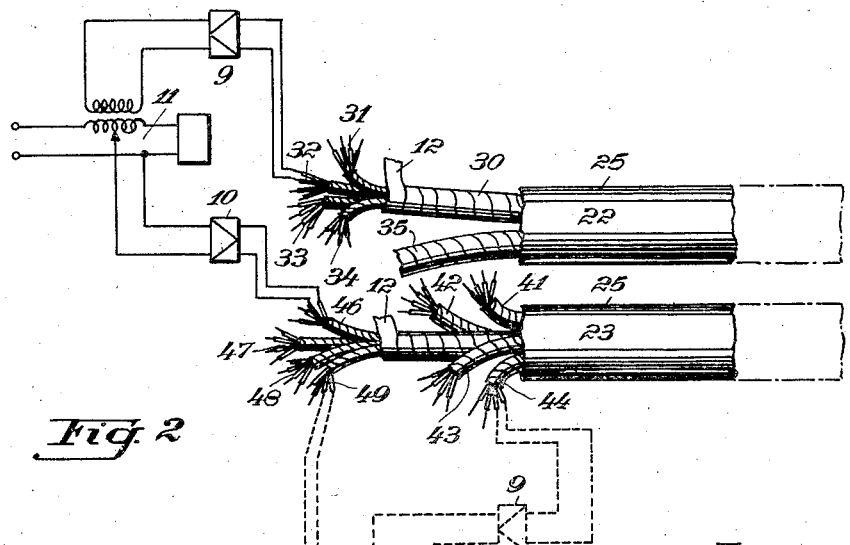
Inventor
Freiherr Walter von Werther
by
Lothar Kehlenbeck
Attorneys.

Patented Apr. 14, 1936

2,037,552

UNITED STATES PATENT OFFICE 2,037,552

CABLE SYSTEM

Freiherr Walter von Werther, Berlin-Siemensstadt, Germany, assignor to Siemens & Halske, Aktiengesellschaft, Siemensstadt, near Berlin, Germany, a corporation of Germany Application January 21, 1933, Serial No. 652,846
In Germany January 22, 1932

10 Claims. (Cl. 179—78)

My invention relates to a "cable system" and more particularly to an improvement for submarine cables of high attenuation for four wire telephone transmission. The cables used in the four wire transmission system are composed of two partial cables, transmitting the messages for instance from East to West and from West to East respectively, each partial cable containing a plurality of circuits screened one from another, these forming one object of the invention. Another object of the invention is the use of such partial cables for the transmission in the opposite direction, only at the transmitting end of the cable system.

In an earlier application Serial No. 514,735, filed February 10th, 1931, there was proposed a communication cable, and particularly a submarine cable, for long distances used in connection with repeaters in a four wire transmission system, the cable being partially or entirely divided into partial cables, one of them containing the wires for the transmission in one direction, the other containing the wires for the transmission in the opposite direction. Such a cable system is advantageous not only in electrical but also in mechanical respect. In case one cable is damaged by anchors or the like, the other cable may be used for some transmission circuits, and particularly to establish a communication in opposite directions at intervals.

It is an object of my invention to improve such cable systems by so dimensioning and constructing the partial cables that in the case of disconnection of one of the partial cables the other may be used in several or all the wires for communication. Some or all circuits or groups of circuits of the cables are electrostatically and/or electromagnetically screened for obtaining a cross talk transmission equivalent, sufficient for auxiliary communications.

My invention is illustrated in the accompanying drawing, in which Fig. 1 represents a cable system using two partial cables in four-wire-connection for the normal service, screened circuits being provided for auxiliary service, the two cables being composed of screened pairs of wires and screened quads respectively. The cables of Fig. 2 are composed of two groups of screened circuits, arranged in two bundles and two concentric wire groups respectively. The screened circuits may be used in the following manner:

(1) Screened double conductors

This screening method is advantageous for normal service, obtaining low far end cross talk currents. Furthermore there can be obtained a sufficient near end cross talk transmission equivalent for the auxiliary service. The screened pairs of wires may be used for four wire circuits so as to establish a connection for half the number of conversations. For this communication it may be sufficient to screen half the number of double-conductors. The screened double conductors may also be used for carrier-current communications in "two band connection" or "four wire connection". Two wire connections, under certain circumstances, may be employed particularly in connection with suppressor equipments so that transmission is effected alternately in opposite directions.

(2) Screened four wire cores

Such a cable may be used for four wire operation transmitting speech frequency bands or carrier current speech bands. The screened four wire cores also may be used for two wire operation in one physical circuit with voice frequency currents, in the other physical circuit with carrier-currents. Two screened four wire cores may be employed e. g. for the transmission of currents of opposite directions, so that by these two pairs of every quad two four-wire transmission circuits for voice frequency and/or superposed carrier frequency currents may be established.

(3) Screened groups of wires for example in the form of half cables or concentric wire layers Similar to case (2) one pair of a screened group of wires may be used for transmission in one direction and one pair of the other group for transmission in the opposite direction. Carrier current four wire operation may be superposed on these lines. By this method I effect a saving in screening means and obtain advantages in respect of pair to pair capacity.

The cross talk transmission equivalents of the lines destined for auxiliary service are preferably chosen of such a value as to obtain sufficient articulation even if not sufficient secrecy. The screening means should be chosen and dimensioned in respect of cross talk transmission equivalent from 4.5 to 8 Np. If provision is made for lines used in low and carrier frequency communication circuits for the auxiliary service, the screening means should be chosen so as to obtain a cross talk transmission equivalent of about 7 Np. for the voice frequency circuit and of about 5 Np. for the carrier transmission circuit.

The auxiliary service may be provided for only half the number of communication circuits in order to reduce the costs for screening means. In this case one may screen only two groups of wires equal in number one to another by dividing each cable into two half cables in concentric or non-concentric form. The screened groups may then be used for four wire operation, each of them transmitting currents in opposite directions. Screening means may or may not be employed over the entire length of the cables. Screening at the end sections of the cables may often be sufficient.

Cable systems according to the invention may also be used for voice frequency telegraph communication or the like.

Fig. 1 shows a cable system for four wire connection using two partial cables for communications in opposite directions. Only one end section of the partial cables 20 and 21 is shown, the middle sections of the cables may be assembled to a single cable or the partial cables may be separated for the whole length. The partial cable 20 covered with a lead sheath 25 contains double conductors (four of them being represented in the drawing), three double conductors 1, 2, and 4 are each surrounded by a metal band 12. The double conductor 3 is only insulated by a paper-band 13. The double conductors consist in a known way of insulated wires. The partial cable 21 is furnished with a lead sheath 25 and composed of four-wire cores. The quads 5, 6 and 7, 8 are surrounded by iron bands 14 or other suitable magnetic bands. The normal service is established over four wire circuits as schematically shown in connection with the pair 1 of cable 20 and the pair 5 of cable 21. The cable lines are connected to repeaters 9 and 10, adapted for transmission in opposite directions, a balancing equipment 11, opposing to the transmission of energy from the incoming to the outcoming path. Such four wire circuits may be used for speech-current or carrier current transmission. The other pairs of the cables 20 and 21 may be connected in a similar way. For an auxiliary service either one of these cables may be used. For this purpose, I may, for instance, connect the double lines 1 and 2, as shown in dotted lines, with a four wire transmission equipment, containing repeaters 9 and 10 and the like. The auxiliary connections may be established for cable 20 also in other ways as indicated above under (1). Suitable connections for cable 21 are described above under (2).

Fig. 2 shows two partial cables 22 and 23 according to the invention. The partial cable 22 contains two screened bundles of wires 30 and 35, each of them consisting of several quads. The screening bands 12 may be composed of iron or other magnetic material or copper or other material of high conductivity. The partial cable 23 is composed of two concentric quad-groups 41, 42, 43, 44 and 46, 47, 48, 49 respectively, screened by a metal band 12 one from another. The pairs of the cable 22, for example of the quad 32, are shown as used for the transmission in one direction, the pairs of the other cable 23 for example of the quad 46 for the opposite direction of a four wire connection.

Auxiliary service may be established as indicated by dotted lines in Fig. 2 and described above under (3) by using the pairs of one cable for outward and return paths.

I claim:

1. A telephone system comprising a cable and particularly a submarine cable of high attenuation, said cable being divided at least at the ends into two separate partial cables and of proper dimensions for transmitting the currents in one direction of communication of a four-wire connection, through the conductors of one of said partial cables, and for transmitting the currents in the opposite direction of the four-wire connection, through the conductors of the other partial cable, each of said two partial cables having conductor circuits and electrical means for screening such circuits from each other, said electrical screening means being of a power sufficient with exclusive reference to an auxiliary service in such a way that in the event of one of the partial cables becoming unserviceable, an auxiliary service may be maintained through a plurality of the mutually screened conductors of the undamaged partial cable.

2. A communication system according to claim 1 in which at least one partial cable contains double conductors surrounded by metallic screens.

3. A communication system, according to claim 1, in which at least one partial cable contains quads, some of them being screened one from another.

4. A communication system according to claim 1, in which at least one partial cable contains wires arranged in two groups, the groups being screened metallically.

5. A communication system according to claim 1, in which at least one partial cable contains wires arranged in two concentric groups, the groups being screened metallically.

6. A communication system according to claim 1, in which at least one partial cable contains wires arranged in two bundles, forming two halves of the cables, metallically screened one from another.

7. A communication system according to claim 1, in which the screening means is so constructed and dimensioned that sufficient articulation is obtained for an auxiliary service over one of the partial cables.

8. A communication system according to claim 1, in which the screening means is so constructed and dimensioned that for an auxiliary service over one of the partial cables a cross talk transmission equivalent between 4, 5 and 8 Np. is obtained.

9. A communication system comprising a cable for use in four-wire connection, said cable being divided at least at the ends into partial cables, each of said partial cables containing a plurality of wire circuits, and means in each of said partial cables for screening some of said circuits from the others, means for establishing, for normal service, a four-wire connection utilizing two wires of one of said partial cables and two wires of the other partial cable, and means for establishing, for auxiliary service in the event one of said partial cables becomes unserviceable, a four-wire connection utilizing two pairs of wires of the other partial cable, such pairs being screened from each other.

10. A communication system comprising a cable for use in four-wire connection, said cable being divided at least at the ends into partial cables, each of said partial cables containing a plurality of wires arranged in groups, each group being composed of at least two wires, means in each of said partial cables for screening each of said groups from the others, means for establishing, for normal service, a four-wire connection utilizing two wires belonging to the same group of one of said cables and two wires belonging to the same group of the other cable, and means for establishing, for auxiliary service in the event that said partial cables becomes unserviceable, a four-wire connection utilizing two wires belonging to the same group of the other cable and two wires belonging to one other group of such other cable.

FREIHERR WALTER von WERTHER.